United States Patent [19]
Rickards, Jr.

[11] Patent Number: 5,319,967
[45] Date of Patent: Jun. 14, 1994

[54] WIND SPEED INDICATOR

[76] Inventor: Charles R. Rickards, Jr., 38 Palm Ave., San Francisco, Calif. 94118

[21] Appl. No.: 92,555

[22] Filed: Jul. 19, 1993

Related U.S. Application Data

[63] Continuation of Ser. No. 730,061, Jul. 15, 1991, abandoned.

[51] Int. Cl.⁵ .............................................. G01F 1/00
[52] U.S. Cl. .................... 73/170.06; 73/170.07; 73/861.74; 73/170.05
[58] Field of Search ........... 73/170.05, 170.04, 170.07, 73/861.74

[56] References Cited
U.S. PATENT DOCUMENTS

| | | | |
|---|---|---|---|
| 983,127 | 1/1911 | Evensen | 73/861.74 |
| 1,879,267 | 9/1932 | Hurni | 73/170.06 |
| 2,017,224 | 10/1935 | Wilhelm | 73/170.06 X |
| 3,404,566 | 10/1968 | Cordova | 73/170.07 X |
| 3,442,125 | 5/1969 | Foley | 73/861.74 |
| 4,107,989 | 8/1978 | Peters | 73/170.07 |
| 4,286,463 | 9/1981 | Cole | 73/170.07 |
| 4,730,488 | 3/1988 | David | 73/170.07 |

*Primary Examiner*—Richard E. Chilcot, Jr.
*Assistant Examiner*—Elizabeth L. Dougherty
*Attorney, Agent, or Firm*—Don Halgren

[57] ABSTRACT

The present invention comprises a wind speed indicating device wherein a plurality of panels of flexible fabric are attached to a vertically disposable holding component. Each panel of flexible material is heavier or more wind resistant than the one above it, thus requiring a higher wind necessary to unfurl it or extend it horizontally. Each panel has markings on its side to indicate the wind speed required to effectuate its unfurling.

9 Claims, 3 Drawing Sheets

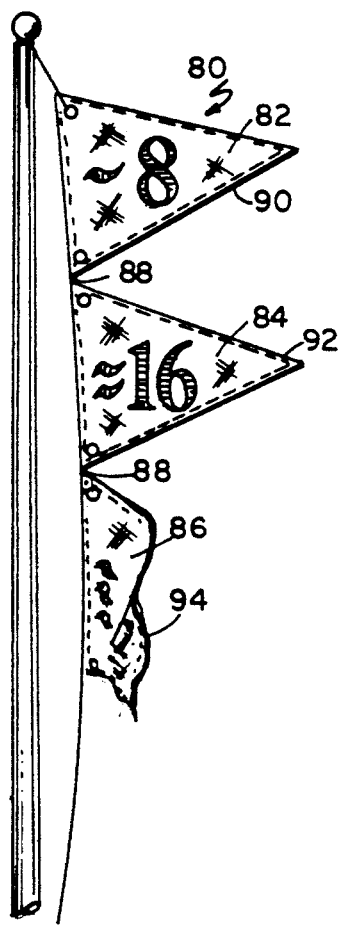
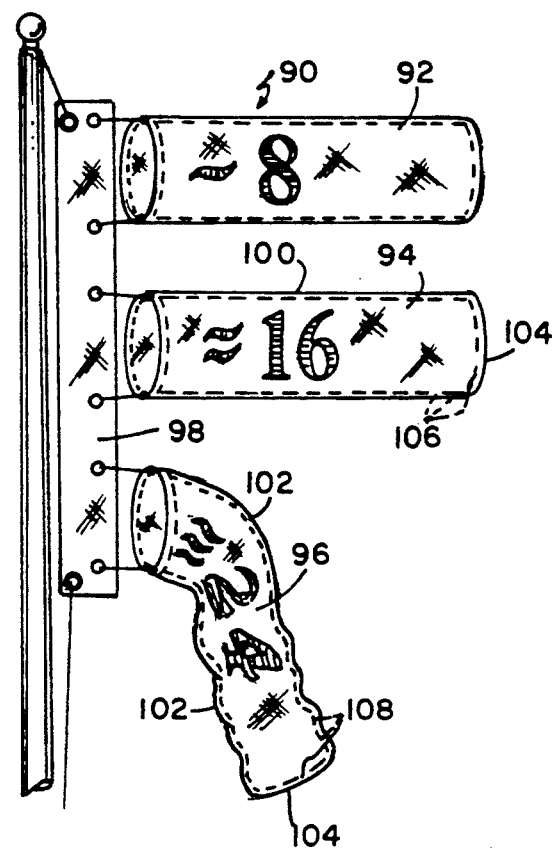
FIG. 4
FIG. 5

WIND SPEED INDICATOR

This is a continuation of copending application Ser. No. 07/730,061 filed on Jul. 15, 1991, now abandoned.

BACKGROUND OF THE INVENTION

1. Field of the Invention

This invention relates to wind speed and wind direction indicators, and more particularly to multiple fabric devices for indicating wind speed and direction.

2. Prior Art

Sailors, sportsmen and outdoorsmen over the years have developed ways to see how fast or in what direction the wind is blowing. Sailors nowadays may utilize complicated, expensive electronic devices unreadable from a distance, or watch the waves, or telltales on their sails. They may also refer to storm warning flags on the docks. Golfers use a pennant on a pole to try to estimate the wind speed and direction.

A device to indicate wind speed may be seen in U.S. Pat. No. 1,579,034 to Roberts which shows an arrangement for golf green wind speed indication. This is basically a windsock with a swivel coil.

An unusual wind sock is shown in U.S. Pat. No. 3,696,672 to Lindsay which includes curved vanes to help indicate the wind force in addition to the wind direction indicated by the sock.

U.S. Pat. No. 4,286,463 to Cole discloses a complicated air sock device with a spring for effecting pivotal movement in response to wind speed.

U.S. Pat. No. 4,558,862 to Kelly discloses a golf pin sock with tailing strings to indicate wind direction. These strings are intended to indivate a small level of wind activity, but do not indicate wind strength.

U.S. Pat. No. 4,730,488 to David discloses a windsock with spaced chevrons on its upper surface arranged to indicate wind speed, based on the number of chevrons observable from above.

None of the prior art addresses the need for determining speed as well as direction in a portable device, carryable or attachable to a dock, boat, roof, or holdable aloft by hand, and which is discernable from distances of several hundreds of feet.

It is an object of the present invention to overcome the disadvantages of the prior art.

It is a further object of the present invention to provide a simple, inexpensive to manufacture, accurate, easy to interpret means for determining wind speed from a distance.

It is yet a further object of the present invention to provide a wind speed indicating device which can function as a club burgee, flag or advertising banner.

BRIEF SUMMARY OF THE PRESENT INVENTION

The present invention comprises a wind speed and wind direction indicating device which may be readily attachable to a dock or flagpole, or it even may be hand held.

The present invention, in its preferred embodiment comprises a plurality of parallel strips of fabric each secured at one end to a common holding component, each successive strip of fabric having successively increasing resistance to the unfurling thereof in the wind. As wind speed increases, the otherwise flacid wind resistant fabric strips assume a horizontal disposition, due to the particular wind speed, accumulating more strips in that horizontal flow pattern as the wind speed has increased. The preferred embodiment contemplates a plurality of pieces of fabric of rectangular panels, attached at a common end, to a holding fabric. Each panel of fabric may have a receiving means associated therewith, such as a peripheral hem or pocket means. The device has at least three panels attached to the holding fabric. An uppermost panel, as may be typical, may be comprised of silk, nylon, dacron or the like, with a standard overlapping hem.

An adjacent intermediate panel, attached at a common narrow end to the holding fabric, may be made of a similar or heavier material or of multiple layers as the upper panel. The adjacent panel may have a hem or pockets in which flexible weighted components such as weighted beads are sewn therewithin, to effectuate resistance to unfurling and free flapping in a light wind which however would cause its upper adjacent neighboring panel to extend and flap in the wind.

A lowermost adjacent panel is also attached at a common end to the holding fabric. The lowermost panel may also have a hem or pockets in which even more flexible weighted components than are found in the intermediate panel, are sewn or disposed therein.

It is contemplated that each panel in the windspeed indicating device is of a different color than any other panel in the device.

It is contemplated that each of the panels are the same size, but if the device were of a non-rectangular shape, the only requirement would be that the panel or fabric component become horizontally extended at a known wind speed. Further embodiments contemplate nonrectangular shapes such as triangles, wind socks or club burgee shapes.

A further embodiment of the present invention contemplates the panels being made of successively heavier or less resilient fabric from the highest panel to the lowermost panel, in addition to or alternatively to the successively greater weights attached to the array of panels displayed in the device recited hereinabove. The increasing weight to surface area ratios provide progressively increasing resistance to wind.

A still further embodiment contemplated in the present invention comprises a fabric with greater wind resistance from a rougher more coarse material with an irregular surface as the lowermost panels, compared to a smoother, lighter panel in the uppermost location in the device, of nylon or the like.

Yet another embodiment may comprise graphic indicia or electronic means which serve to increase a user's ability to interpret wind speed and direction from this device. One embodiment includes markings which indicate wind speed relevant to each panel. Another embodiment includes the use of reflectors or lights which increase visibility in low light conditions. Those graphics or visible markings will be different for each panel and as such, may comprise part of the weighting materials utilized to successively increase wind resistance. Such visible indicia may be comprised of a distribution of reflective markings or lights flexibly connected to a battery or power source adjacent or in the holding fabric or pole to which the holding component fabric may be secured. One row of serially connected lights may be arranged across the uppermost panel. The next adjacent lower panel may be weighted with two rows of lights to increase the wind resistance of that panel before it unfurls into a horizontal disposition. The lower panels may have successively more rows or numbers of flexible lights thereon, so that successively higher wind speeds are required to extend the successively heavier or more wind resistant panels. The indicia described in this particular embodiment would still act as weighting means on the particular panels in daylight as the aforementioned embodiments, the reflectors or lights making the present invention particularly useful in night or low light conditions.

BRIEF DESCRIPTION OF THE DRAWINGS

The objects and advantages of the present invention will become more apparent when viewed in conjunction with the following drawings, in which:

FIG. 4 is a side elevational view of a further embodiment of the present invention; and FIG. 5 is a side elevational view of yet another embodiment of the present invention.

DESCRIPTION OF THE PREFERRED EMBODIMENTS

Figure 1:
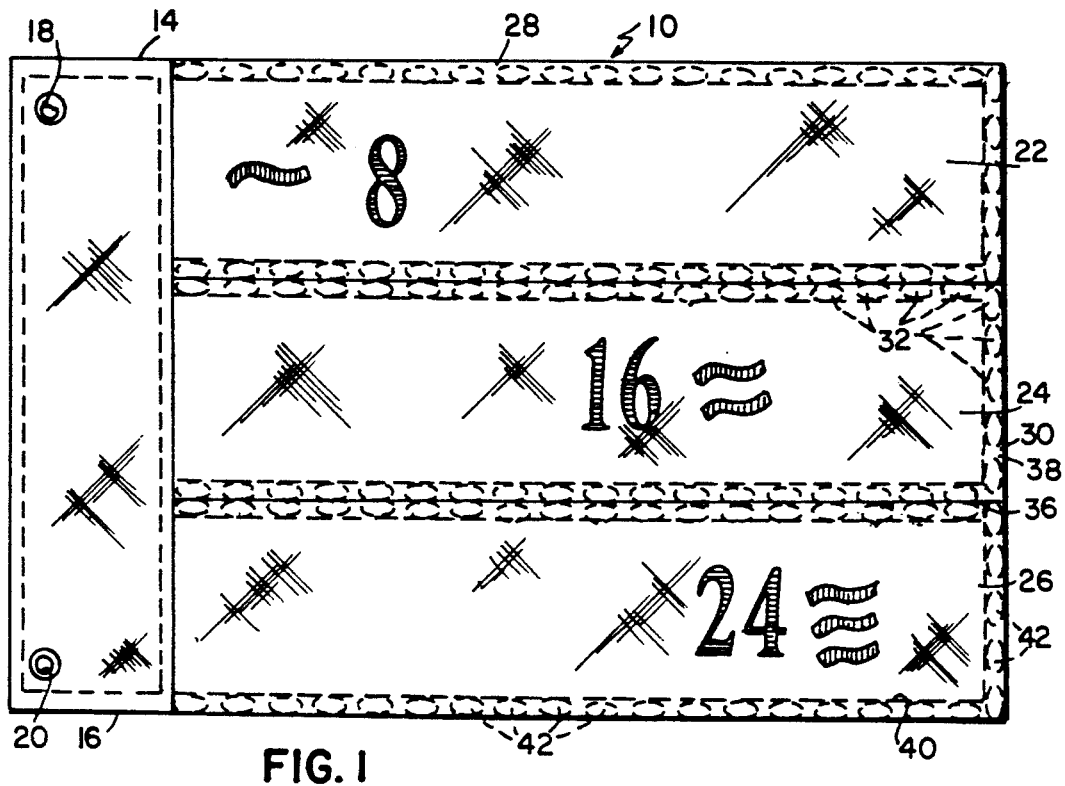
FIG. 1 shows a side elevational view of a wind speed and direction indicating device constructed according to the principles of the present invention.
Figure 2:
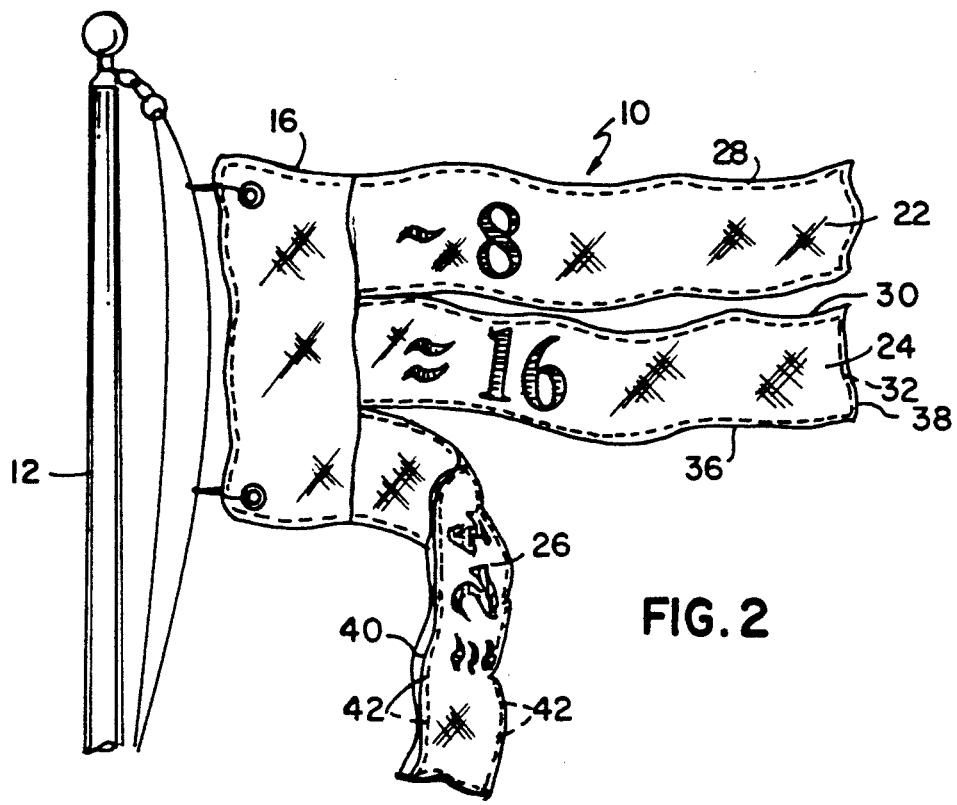
FIG. 2 is a side elevational view in an "as-utilized" mode, wherein the device is secured to a pole in a wind blowing fast enough to get only two of the three panels of the device unfurled.

Referring now to the drawings in detail, and particularly to FIG. 1, there is shown a wind speed indicating device 10, having capabilities for being held by hand, or on a staff 12, as shown in FIG. 2.

The wind speed indicating device 10 in its preferred embodiment, comprises a holding component 14, which in this case is a component of vertically disposed material 16, having an upper grommet 18 and a lower grommet 20 for securement purposes. A plurality of parallel, rectangular, similarly dimensioned strips (panels) of flexible fabric 22, 24 and 26, are each secured at their narrow ends, to the vertical rectangular component 16, as shown in FIGS. 1 and 2. The peripheral dimension of the whole device 10 in this embodiment is 30"×30", and the dimension of each panel is 25"×10".

The upper flexible fabric 22, may have a hem 28 around its periphery, although such a hem may be arranged elsewhere across the panel, as necessary. The hem 28 is an overlap of material common in fabric art. The material comprising the upper flexible fabric 22 is preferably a single layer of material such as 200 denier nylon, and weighs about 0.8 oz.

The intermediate panel of flexible fabric 24, preferably is comprised of a double layer of material with an intermediate liner layer of flexible material therein, so as to give the intermediate panel of flexible fabric 24 the slight extra weight to proportionately increase the wind speed required to unfurl it, for a weight of about 2.7 oz. in this embodiment. This panel of flexible fabric 24 may have a hem 30 extending peripherally therearound, as shown in FIGS. 1 and 2, or as otherwise arranged, as aforementioned. The hem 30 on this second or intermediate panel of flexible fabric 24 may alternatively include a plurality of weights such as beads 32 as part of a stringed arrangement, stitched therewithin, depending on the wind speed desired for unfurling thereof. The beads 32 may extend in a spaced relationship along the long sides 36 and/or the short distal end 38 of the intermediate panel of flexible fabric 24, wherever the hems are arranged. Alternatively, an arrangement of pockets, not shown, may be disposed on or in the panels and so contain the weights or beads.

The lowermost panel of flexible fabric 26 preferably is comprised of a double layer of flexible material with an intermediate inner layer as abovementioned, with a hem 40 extending peripherally therearound, as shown in FIGS. 1 and 2. The hem 40, either peripheral or otherwise as aforementioned, on this third or lowermost panel of flexible fabric 26 may have a plurality of beads 42 as part of a stringed arrangement, stitched therewithin. The beads 42 may extend in a spaced relationship along the sides 46 and/or the short distal end 48 of the lowermost (third) panel of flexible fabric 26. The flexible weight arrangement of beads 42 in this panel weigh a bit more than the flexible weight arrangement of beads 32 in the adjacent flexible fabric 24 hem 30, bringing the total weight of this panel to about 5.5 oz.

The wind speed indicating device 10 shown in FIG. 2 has the uppermost flexible fabric 22 and the intermediate flexible fabric 24 shown unfurled in a representative breeze of about 16 miles per hour. This is indicated because the lowermost panel of flexible fabric 26 is not extended or unfurled in the breeze, and the intermediate panel of flexible fabric 24, rated for unfurling in this embodiment for unfurling in no less than about a 16 mile per hour breeze, is extended or unfurled. If a breeze of at least about 24 miles per hour were blowing, the lowermost panel of flexible fabric 26 would be unfurled and flapping extended in the breeze, because that is the minimum windspeed needed to overcome the weighted wind resistance of the panels of flexible fabric 22, 24 and 26.

Figure 3:
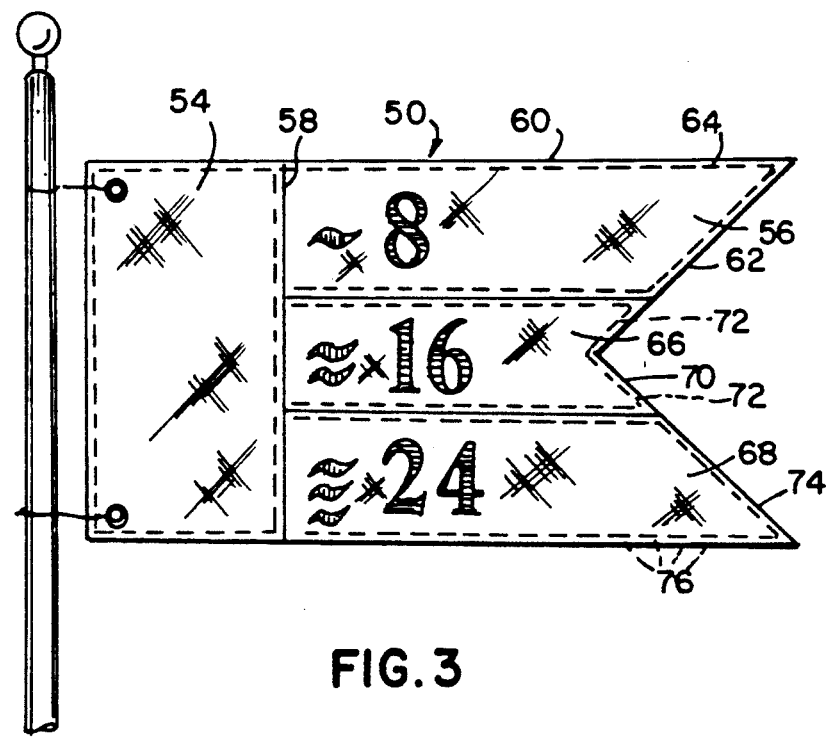
FIG. 3 is a side elevational view of another shape of the present invention.

Another embodiment of a wind speed indicating device 50 is shown in FIG. 3, wherein a club burgee type periphery is displayed on a staff 52. This wind speed indicating device 50 has a holding component 54 of flexible fabric in a rectangular shape, typically made of one or more layers of nylon, orlon, silk or the like fabric, of about a 200 denier as aforementioned. The wind speed indicating device 50 in this embodiment has an uppermost panel of flexible fabric 56 having a proximal end 58 attached to the holding component 54, as by stitching or the like. The uppermost panel of flexible fabric 56 has parallel long sides 60 and a diagonally disposed distalmost end 62. The uppermost panel of flexible fabric 56 may have a hem 64 extending peripherally around its long sides 60 and distalmost 62. The uppermost panel of flexible fabric 56 will not have any weighted beads sewn into its hem 64, unless it is desired to adjust or change the wind speed rating at which the panel of flexible fabric 56 will extend horizontally.

The wind speed indicating device 50 also has an intermediate panel of flexible fabric 66 and a lowermost panel of flexible fabric 68. The intermediate panel of flexible fabric 66 may have a hem 70 spaced around its periphery where it is not attached to the holding component 54. Since this intermediate panel of flexible fabric 66 is of shorter length than its adjacent uppermost and lowermost panels of flexible fabric 56 and 68, a weight means 72, such as an arrangement of beads will be different than that necessary for the intermediate panel of flexible fabric 24, shown in FIG. 1. The lowermost panel of flexible fabric 68 may have a hem 74 extending around its periphery where it is not attached to the holding component 54. Since this lowermost panel of flexible fabric 68, at least in this figure is longer than the intermediate panel of flexible fabric 66 it will need a different calibration and more weights to provide the equivalent resistance to unfurling it may require an array of weight means 76 such as beads which are not as heavy as the weight means (beads) 72 in the hem 70 of the intermediate panel of flexible fabric 66.

The speed of the wind necessary to unfurl and extend any particular panel of flexible fabric will be higher for heavier weight cloth or fabric with additional weights creating a higher weight to surface area ratio.

Yet another embodiment of a wind speed indicating device 80 is shown in FIG. 4, wherein an array of panels comprising an uppermost panel of flexible fabric 82, an intermediate panel of flexible fabric 84, and a lowermost panel of flexible fabric 86 are attached to a holding component 88. In this embodiment, the panels of flexible fabric 82, 84 and 86 are of triangular configuration and are of the same size. Each panel of flexible fabric 82, 84 and 86 may have a hem 90, 92 and 94 respectively. Each hem 90, 92 and 94 will as aforementioned in the earlier embodiments, have differing weights of flexible beads or the like stitched therewithin. Each panel of flexible fabric 82, 84 and 86 may have an indicia thereon marking the wind speed necessary to make it unfurl or extend outwardly horizontally in a breeze or gust of wind.

Each panel of flexible fabric 82, 84 and 86 could also be of increasingly larger dimension than the one above it, thus having its own increasingly larger wind resistance.

Also, each panel of flexible fabric 82, 84 and 86 could be made of thicker fabric or cloth, or be rougher in texture in each successively lower panel to inherently increase its wind resistance accordingly or increase the weight to surface area ratio.

A further embodiment of a wind speed indicating device 90 is shown in FIG. 5 wherein an array of panels, each arranged in a sock-like or tubular fashion, comprise an uppermost tubular panel of flexible fabric 92, an intermediate tubular panel of flexible fabric 94, and a lowermost tubular panel of flexible fabric 96, each of which is tethered to a holding component 98. Each tubular panel of flexible fabric 92, 94 and 96 has its wind speed unfurling indicia marked thereon. The intermediate and lowermost tubular panels of flexible fabric 94 and 96 may be multilayered material as the aforementioned embodiments and they may have a longitudinal hem 100 and 102 and/or a distalmost hem 104 in which successively increasingly heavier weight means 106 and 108 such as beads may be attached therewithin. The holding component 98 may be comprised of an elongated piece of fabric of sufficient length to accommodate the attachment of each tubular panel of flexible fabric 92, 94 and 96 thereto.

Figure 1A:
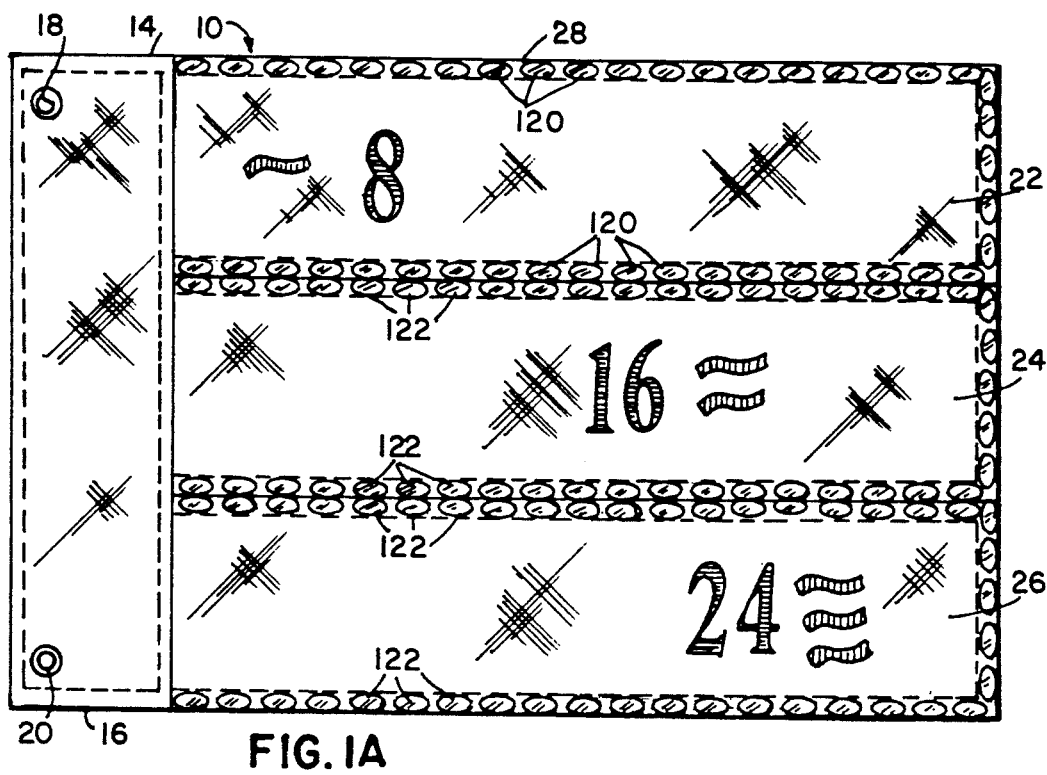
FIG. 1A is a view similar to that shown in FIG. 1, showing several weight means thereon.

A still further embodiment in the flexible fabric shown in each of the figures aforementioned, may consist of reflector 120 and/or battery operated lights, 122, as shown in FIG. 1A which increase in number (and hence in weight/wind resistance-wind speed required to unfurl) from the uppermost flexible panel to the lowermost flexible panel. The lights would take the place of, or could be in addition to any weighted beads built into the hems of each panel. The lights would be readily distinguishable at night, say by the length of the trail of lights or the number of rows on each side of the flexible fabric which is/are unfurled or extended horizontally, flapping in the breeze.

It is to be noted that the "unfurling" resistance to a generally horizontally displayed flexible panel of the present invention may be dependent on the weight of the fabric comprising the panel, whether that weight is increased from a weight means stitched into a hem or a pocket on or in the panel, or whether that weight comes from a heavier flexible fabric or a plurality of flexible fabrics arranged in a layered or sandwich manner to make a single panel.

Further embodiments to the wind speed indicating device include the adaptability of the hems or pockets or panels themselves to have additional weight (or marker indicia such as lights or reflectors comprising numbers or letters secured for example, by common hook and loop means known by the tradename of Velcro) added to them or removed from them to change the respective wind speed necessary to unfurl the individual panels.

Thus there has been shown a unique wind speed indicating device, which is easily and inexpensively manufactured, is readily attachable to posts, poles, docks or the like in a environment in which wind speed is desired to be determined from a distance, which can be adapted to different wind speeds that one wishes to determine.

I claim:

1. An arrangement of flags for indicating wind speed from a distance, comprising:
   a vertically arranged flagpole;
   at least three separate independently extensible fabric panels attached to a holding component which is arranged to hold said fabric panels onto said flagpole, so said panels are distinguishable from one another and visible from a distance; and
   each of said fabric panels having a peripheral hem therearound including different weight means therewith which are different from said panels vertically adjacent thereto permitting each of said panels separate horizontal extension thereof from said holding component and said vertical flagpole, in a wind.

2. An arrangement of flags as recited in claim 1, wherein each of said hems on said panels is arranged as a containment pocket for said weight means for said panels.

3. An arrangement of flags as recited in claim 2, wherein each of said panels is similarly sized to those of said panels vertically adjacent thereto.

4. An arrangement of flags as recited in claim 3, wherein said weight means comprises a plurality of beads.

5. An arrangement of flags as recited in claim 2, wherein each of said panels is of different texture fabric from its vertically adjacent panel.

6. An arrangement of flags as recited in claim 3, wherein each of said panels is rectangularly shaped permitting them to be visible from a distance.

7. An arrangement of flags as recited in claim 3, wherein said weight means includes a plurality of lights arranged on said hem permitting said panels to be visible from a distance.

8. An arrangement of flags as recited in claim 3, wherein said panels comprise a different number of layers of fabric than each of said panels vertically adjacent thereto.

9. An arrangement of flags as recited in claim 3, wherein said weight means includes a plurality of reflectors arranged on said hem.

* * * * *